Figure 3:
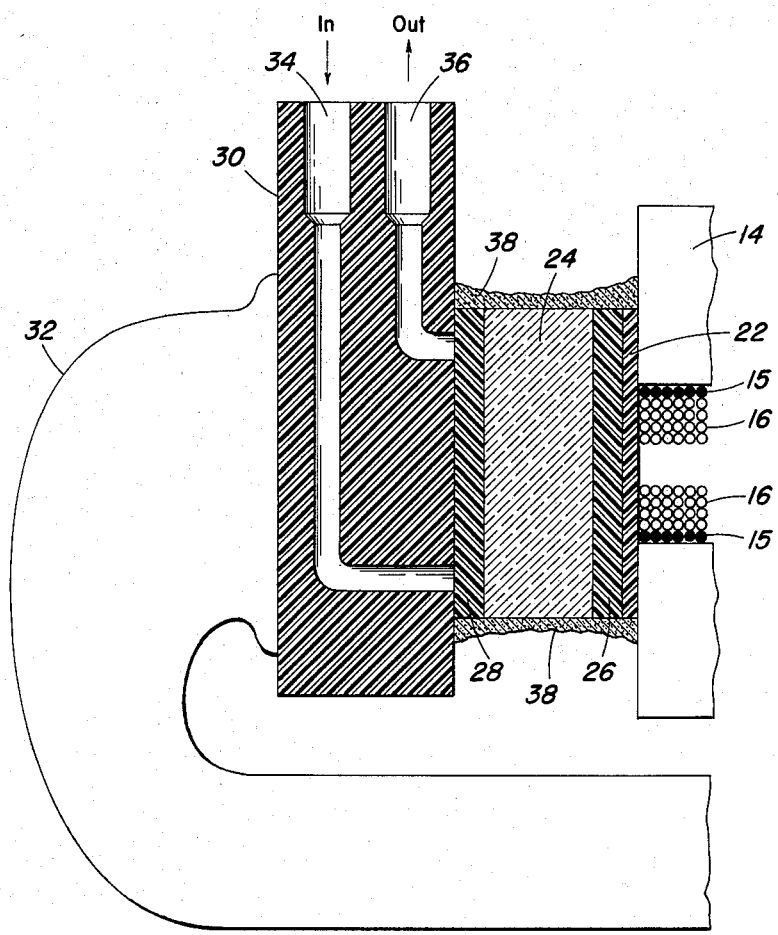

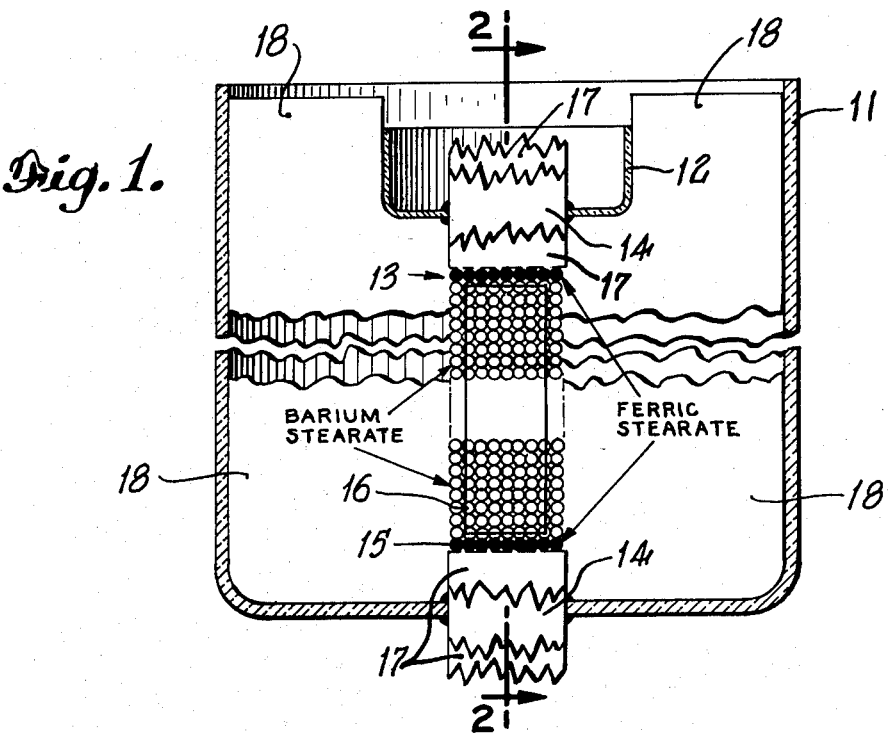
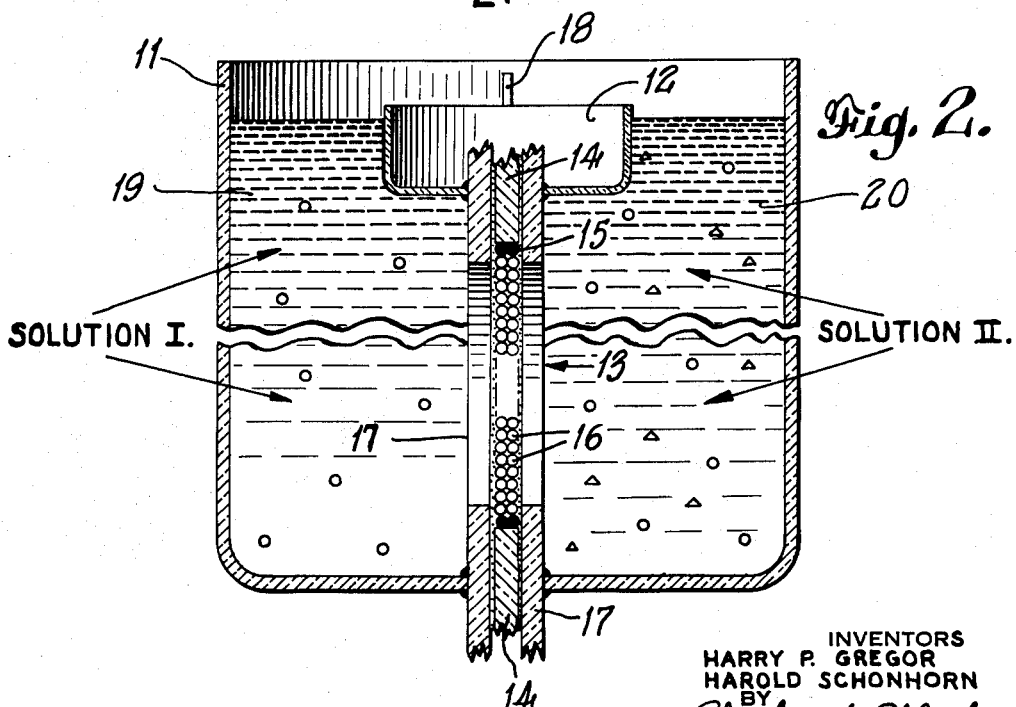

June 28, 1966 H. P. GREGOR ETAL 3,258,414
MULTILAYER MEMBRANE ELECTRODES
Filed Jan. 30, 1961 2 Sheets-Sheet 2

INVENTORS
HARRY P. GREGOR
HAROLD SCHONHORN
BY
Charles J. Elderkin
ATTORNEY

United States Patent Office 3,258,414
Patented June 28, 1966

3,258,414
MULTILAYER MEMBRANE ELECTRODES
Harry P. Gregor, Hewlett, and Harold Schonhorn, Brooklyn, N.Y., assignors to Polytechnic Institute of Brooklyn, a chartered corporation of New York
Filed Jan. 30, 1961, Ser. No. 85,728
10 Claims. (Cl. 204—195)

This application is a continuation-in-part of our copending application Serial No. 721,790, which was filed on March 17, 1958, and has since been abandoned.

This invention relates to improvements in devices for use in determining and indicating the activity and effective concentration of certain ions in the presence of other ions, both in aqueous and non-aqueous solution. More particularly, the invention contemplates the provision of improved film or membrane-type electrodes which are formed of multimolecular layers, where the particular ion being determined is the counter ion of a long-chain molecule making up the multilayer of the electrode. In essence, the invention involves the fabrication of a film or membrane useful as an electrode within a system of the concentration cell-type and the measure of the potential developed across the film within such a system transverse to the axis of orientation of the molecules making up the multilayer structure of the film. There is also provided a modification thereof wherein the multilayer membrane is so protected that a high concentration of different salts may be had in electrolytic solutions wherein the electrode is employed without affecting the ion-specificity of the electrode itself.

Heretofore, a number of membrane-type of devices for the determination of ionic activities have been described in the patent and technical literature, including, for example, ion-exchange membranes or ion-selective membranes which are useful for the determination of permeable ions. In general, however, the latter specific types of membrane cannot be employed to determine the activity of one ion in the presence of another permeable ion.

Other electrode devices which have been suggested heretofore include the hydrogen gas electrode, the glass electrode and various membraneous electrodes based upon different types of glasses and clays. For the most part, the practical applications of such known forms of electrodes are somewhat restricted by reason of their lack of specificity, as well as limitations arising due to their particular materials of construction. For example, the antimony electrode behaves satisfactorily within the pH range of from 2 to 7, but in more acid or alkaline solution, the solubility of the oxide interferes with the accuracy of the determinations. Similarly, the quinhydrone electrode is only accurate within solutions of pH less than 8, in that, in more alkaline solutions, oxidation of the quinhydrone by air occurs readily.

It is a specific object of the present invention to provide an electrode device of the general class described which is highly specific to the particular ion being determined, even in the presence of high concentrations of other, similar ions. A further object of the invention resides in the provision of an ion determining mechanism by which extremely thin membranes can be formed to exhibit almost perfect specificity for ion transport, i.e. the ability to concentrate a specific ionic species without completely immobilizing that species. A particular feature of the present invention involves the provision of a multilayer membrane electrode suitable for use where very high concentrations of univalent cations are present in solution with reduced quantities of divalent cations including the ionic species, the concentration of which is to be determined, i.e. a molar ratio of univalent cations to divalent cations in excess of about 10 to 1. This modified electrode is particularly valuable in extending the utility of the membranes described herein to employment with biological media where the ratios of univalent cations to divalent cations equals and exceeds 50:1.

It is believed that the foregoing features and objects as well as the invention itself, will be best understood by reference to the following detailed description of specific embodiments of the electrodes of the present invention, taken in conjunction with the accompanying drawings in which FIGURES 1 and 2 illustrate a static type concentration cell incorporating a typical multilayer membrane electrode of the invention and FIGURE 3 shows the protected modification of the aforesaid membrane.

In general, the membranes or ion-determining electrodes of the invention consist of substantially insoluble, partially ionizable films formed of certain systems capable of producing multilayers, and containing the same species of cations or anions as those undergoing determination. In accordance with the techniques described in greater detail hereinafter, a unique type of crystal is obtained, highly oriented such that the mobile ion species can move across it from one solution phase to the other, while virtually inhibiting transport of other ions. A modification of these membranes provides, as noted above, an ion-specific electrode for use in determining selective ionic concentrations within a test solution wherein the ratio of univalent to divalent ions may exceed a ratio of 10:1 and extend upwards of 100:1 without affecting the intrinsic ion specificity of the electrode itself.

The membrane electrodes may be readily prepared by casting successive monomolecular layers of the desired multilayer film-forming material upon two or more mated, non-conducting or insulating matrix surfaces, such as glass or a plastic substance. If desired, an initial monomolecular layer of a different chemical composition from the multilayer can be employed to impart improved adhesion of the multilayer to the supporting matrix. The coated surfaces are then pressed together in such a way as to provide substantially perfect matching of the original mated portions with the multilayer positioned therebetween, and the entire assembly is then cemented or otherwise bound to form the desired electrode.

As a typical example of the foregoing technique, one may crack a conventional laboratory glass slide to provide for two half-sections having a mated common edge corresponding to the line of the break. The separate broken edges are then coated with a specific multilayer forming material, e.g. 50 monomolecular layers of the calcium or barium salt of a long-chain fatty acid and pressed together along the now-coated broken edges to form an electrode structure consisting of the two non-conducting half-sections of the slide separated by the multilayer membrane. The electrode assembly is completed by cementing the two half-sections together with a suitable non-conducting adhesive. Alternatively, one may coat a number of thin glass plates with a common multilayer, cementing their coated faces together either in the form of a single pair or as a pack or stack of several plates having multilayers therebetween. By simply slicing this type of an assembly in a direction parallel to the axis of the multilayers, a plurality of electrodes can be formed.

The molecular coating or multilayer-forming component of the electrode structures of the invention can be selected from any of the systems which form substantially insoluble, partially ionizable multi-molecular layers. For example, metal salts of appropriate long-chain fatty acids can be readily employed, including such typical salts as barium stearate, barium palmitate, barium arachidate, calcium stearate, calcium palmitate, calcium arachidate, ferric stearate, ferric palmitate, and the like. As will be readily apparent, the cationic portion of the multilayer is dependent only on the cationic species being determined provided, of course, that the cation is one which forms an insoluble monolayer with the long-chain acid. The anionic group can be selected from a wide variety of operative groups including, for example, sulfonates, phosphates, and other acidic substituents.

In a similar manner, one can also employ long-chain ammonium and quaternary ammonium compounds and construct an electrode which is specific towards anions which form a substantially insoluble monolayer or multilayer. In addition, monomolecular-layered or multimolecular-layered membrane electrodes can be constructed in which the membrane surface is composed of polymeric ions. It should be noted, however, that ions which are capable of forming molecular layers of similar stability may not be solely potential determining in the presence of one another.

As previously pointed out, the primary characteristic of the molecular membrane devices of our invention is that the ion being determined has its counterpart or counterion in the molecular membrane. While not intending to be bound by any particular theory or mechanism, it is believed that the unique structure of the multilayer is responsible for its specific function. It is known that the molecular layers are highly oriented or in a semi-crystalline state. Pores, in the usual sense, are not present in the membranes. The actual transport of anions or cations, i.e., the potential-determining ions, apparently takes place normal to the axis of orientation of the molecular layers by an exchange between adjacent anions or cations contained within a molecular layer.

The multilayer is a part of this electrode system. Only certain kinds of long-chain compounds, deposited in a highly specific manner in multilayer form on suitable solid surfaces can be employed in this invention. The general procedures for the formation of multilayers were used, but with many significant modifications, as taught in this application. These general procedures for depositing monomolecular layers and multimolecular layers on a non-conducting matrix or support, have been described by K. B. Blodgett, J.A.C.S. 57, 1007 (1935); A. Rothen, "Physical Techniques in Biochemical Research," edited by G. Oster and A. W. Pollister, Academic Press, Inc., New York, 1956, page 156; H. Sobotka, "Medical Physics," Year Book Publishers, Chicago, 1950, page 556 and I. H. Sher and J. D. Chanley, Rev. Sci. Instr., 26, 226 (1955). These references describe general techniques, ones which require refinement and improvement as taught in this patent.

Two distinct types of molecular membranes can be employed in the production of the electrodes of the invention. If desired, the membranes or multilayers can be formed either of alternating layers or non-alternating layers, i.e., either so-called "Y-films" or "X-films," respectively. The Y-films normally comprise multilayers in which the odd-numbered layers are oriented in the same direction and the even-numbered layers oriented in the opposite direction, whereas the X-films comprise multilayers in which the molecular layers are oriented in the same direction. It is found that the relative thickness of the films, i.e., the number of layers present in the multilayer membranes, can be varied widely without appreciably affecting the efficiency or general performance characteristics of the electrodes.

It will be noted that one difficulty which has been observed in the construction of multilayer membrane electrodes is that the introduction of high concentrations of ions not capable of forming insoluble molecular layers tends to cause the multilayer to expand and dissociate. We have found that in actual practice, this effect can be overcome by simply exerting a force or pressure against the multilayer, normal to the axis of orientation of the molecules making it up. For example, a thin strip of a plastic cation-selective membrane, backed up by a porous porcelain rod, or the equivalent, and maintained under high pressure serves to prevent expansion of the multilayer.

In the preferred modification of the present invention there is provided means for containing the multilayer membrane or crystal within the glass slide, such that a high concentration of different salts may be present without affecting the intrinsic ion-specificity of the electrode itself.

Thus, a high pressure which is estimated to be in the range of 100 to 300 atmospheres is imposed on both sides of the crystal formed by the membrane in the crack between the glass slides. This pressure permits unusual conditions to exist in the electrolyte solution and in the membrane without deterioration of the ionic specificity of the latter member where, for example, a divalent alkaline earth metal cation is present in the membrane and a substantial excess of monovalent cations are present in the electrolyte. Therefore, as the molar ratio of univalent to divalent cations rises to in excess of 10 to 1 in the electrolyte, there is a tendency exerted where pressure is not imposed, for the monovalent cations to enter into the crystal structure of the electrode to cause it to swell and finally disrupt due to the osmotic activity of ions which do not form insoluble salts in combination with the long chain fatty acids of the membrane. The pressure exerted thus maintains the volume of the system substantially constant and provides thermodynamically that the standard chemical potential of the univalent cationic fatty acid formed in the membrane is so high as to reduce its mole fraction in the membrane to insignificant levels.

This modification is prepared by casting monomolecular layers of the desired multilayer film-forming material upon two or more mated surfaces of an insulating matrix formed of glass or a plastic film. An added monomolecular layer of a polymeric material may be interposed between the matrix and the multilayer film-forming material to provide improved adhesion of the multilayer membrane material to the supporting matrix. The coated surfaces are then pressed together to provide a matching of the original mated portions with the multilayer positioned therebetween with an orifice for passage of electrolyte, and the entire assembly is then cemented or otherwise bound together to form the electrode. Thus far the mode of preparation is essentially that provided for the basic membrane electrode described above. Placed over the exposed surfaces of the multilayer membrane and parallel to the molecular layer thereof; the ends of the orifice formed through the multilayer; and adhering to the exposed surfaces of the glass half-slides are porous cation permeable polymeric membranes and placed on the surface of these latter membranes are rigid porous glass or ceramic layers. This assembly is then placed under a pressure in the range of 100 to 300 atmospheres, which pressure is imposed on both sides of the membrane or crystal, and the assembly cemented together. After the cementing operation is completed by drying of the cement the electrode is ready for use.

The multilayer membrane electrodes find utility in a wide variety of different applications. For example, the electrodes can be used to determine the calcium ion activity of waters, including sea water.

They may be used to monitor boiler feed water, cooling water, etc., in naval vessels, and in this way serve as indicators for fouling processes. These electrodes, and particularly the preferred modification thereof, as noted above, are especially useful in the fields of biology and medicine, wherein, for example, a calcium stearate multilayer membrane finds employment in the determination of serum calcium ion activities, or calcium ion activities in other biological fluids. The multilayer membrane electrodes of the invention are semi-conductors and find many applications in this field also. For example, the mobile ions can be ions capable of oxidation and reduction, such that one could couple ionic transport with electronic transport to obtain unique properties.

The following specific examples will serve to illustrate the construction and use of a typical multilayer membrane electrode in accordance with the foregoing principles and procedures.

EXAMPLE 1

Membranes were constructed by cracking a standard glass slide in half, so as to insure a nearly perfect fit, because the effective width of the membrane was $2.5 \times 10^{-5}$ cm. Each glass half-slide was coated in a specific manner with 50 Y-type monolayers of barium stearate, the two halves were then fitted together and cemented in place between slides having holes in their centers. Arms were then attached to contain the solutions, and the potential of the system was measured between saturated calomel electrodes.

The resistance of this membrane was $5.8 \times 10^7$ ohms. Accordingly, a highly sensitive vacuum-tube voltmeter ($\pm 1\%$ accuracy) with high input impedance was used with proper shielding. The specific resistance of the barium stearate multilayer in the direction transverse to the axis of orientation was $1.9 \times 10^4$ ohm-centimeter. The resistanec of the cell without the membrane was $5.0 \times 10^9$ ohms; thus correctionas for the cell potential or the use of a guard ring were not required. The asymmetry potential with identical barium chloride solutions in both arms of the cell was 1–2 multivolts, and constant over a period of time. Constant potential readings were obtained rapidly and were stable over periods of time.

The following table shows the experimental and calculated potentials for this multilayer membrane electrode measured at 25° C. against saturated calomel electrodes. The experimentally determined potentials were corrected for the asymmetry potential and for differences in the calomel electrodes. The calculated potentials were obtained using the tabulated data of B. E. Conway, "Electrochemical Data," Elsevier Publishing Co., New York, 1952, p. 102. At higher concentrations, the mean activity coefficients used were taken from H. S. Harned and B. B. Owen, "The Physical Chemistry of Electrolytic Solutions," Rheinhold Publishing Corp., N.Y. 1950, p. 412.

TABLE I

Chain:
| Saturated Calomel Electrode | Solution 1 | Membrane | Solution 2 | Saturated Calomel Electrode |
| --- | --- | --- | --- | --- |

| Solution 1 (Molarity) | Solution 2 (Molarity) | Experimental Potential (mv.) (E.M.F. Corr.) | Calculated Potential (mv.) (E.M.F.) |
| --- | --- | --- | --- |
| 0.002 BaCl₂ | 0.001 BaCl₂ | 7.65 | 7.88 |
| 0.02 BaCl₂ | 0.01 BaCl₂ | 6.65 | 6.55 |
| 0.01 BaCl₂ | 0.001 BaCl₂ | 25.15 | 24.21 |
| 1.0 BaCl₂ | 0.5 BaCl₂ | 5.28 | 4.96 |
| 0.02 BaCl₂ | {0.01 BaCl₂, 0.005 NaCl} | 6.85 | 7.01 |
| 0.02 BaCl₂ | 0.02 NaCl | 8.10 | 8.22 |
| 1.0 BaCl₂ | {0.5 BaCl₂, 2.0 NaCl} | 3.27 | |

As may be observed, the barium stearate molecular membrane electrode is a reversible electrode to barium ions, even in the presence of high concentrations of sodium ions.

EXAMPLE 2

Membranes were constructed by splitting standard glass microscope slides in half; plating out 50 monomolecular layers of a calcium or barium salt of a long chain fatty acid in a specific manner, and cementing the two half slides together. Side arms were attached thereto to entable potential-determining cations to diffuse across the multilayer membrane in a direction normal to the axis of orientation of the long-chain acids. Three electrode systems were constructed according to this general procedure, a Y-type barium stearate multilayer plated from a phosphate buffer substrate at pH 7 with a plating pressure of 30 dynes cm.$^{-1}$. (This electrode is designated by the letter A in the tables appearing hereinafter); a Y-type calcium stearate multilayer cast from the same buffer at 37 dynes cm.$^{-1}$ of plating pressure (and designated electrode B in the following tables) and a Y-type barium hexadecylsulfate multilayer cast from the same buffer at 10 dynes cm.$^{-1}$ (designated electrode F). After cementing together of the two coated half-slides, the plane surfaces thereof were wiped clean with fitler paper to remove the multilayer at that point. The orginial monolayer remained in many instances. A square, 2 cm. x 2 cm. of a cation-permeable membrane formed of an interpolymer of polystyrenesulfonic acid and Dynel (the tradename for copolymers of acrylonitrile and vinyl chloride, the preparation of which is described in U.S. Patent 2,420,330) in a ratio by weight of 1:3 respectively and cast from a solution of the polymers in dimethylformamide; was then laid onto each exposed face of the glass. The polymeric membrane thus deposited was about 25 microns in thickness and had been soaked in a solution of the alkaline earth metal salt, i.e. barium chloride or calcium chloride; the film was then blotted dry of surface moisture.

Directly over the blotted surface of the selective polymeric membranes were placed pieces of porous glass (i.e. Corning Porous Vycor No. 9730), having an average pore diameter of 40 A. (angstroms). This glass is smooth surfaced with parallel faces.

Plastic polymethacrylate blocks were placed on the outside of the porous glass and the resulting assembly clamped in the jaws of a strong vice. The polymethacrylate end blocks had holes cut in them for the entrance of solutions and the electrodes.

Pressure was applied to the cell by turninig the vice or clamp handle. A suitable epoxide cement, Glyptal (a trade-name) was applied to the periphery of the cell, joining the faces of the glass slides and the exposed surfaces of each of the porous glass plates.

Electrical measurements were made using the Keithley Model 200B vacuum tube voltmeter in conjunction with a Kiethley Model 2008 Decade Shunt and a Model 2004A regulated voltage supply, or a Kiethley Model 600 combined unit. This unit had an input grid current of less than 0.05 $\mu\mu$ amperes and at full scale 8, 20, 80 and 200 mv. Its potential readings were accurate to within $\pm 0.4$ percent. Resistances were accurate within $\pm 5$ percent. Saturated calomel and silver-sliver chloride reference electrodes were employed, with appropriate corrections for their asymmetry and the asymmetry potential of the multilayer electrode itself, i.e. less than 2 mv. All potentials were measured at room temperature and corrected to 25° C.

The protected multilayer membrane electrodes possessed ohmic resistances within the range of $10^7$ to $18^8$ ohms, while resistances due to the passage of stray currents were higher by at least three orders of magnitude; corrections to the measured potentials were thus not necessary. Appropriate shielding was employed.

The time required to attain constant potential readings with protected electrodes depended upon the nature of the porous matrix and the cation-permeable membranes used. In general, when starting with a dry cell a period of about one hour was required to attain constant values. If the composition of the solution was changed but slightly, as in going from a 0.01 molal solution to a 0.02 molal solution, about ten minutes was required to reach a constant potential. Large changes in composition led to longer times for response, of the order of one hour.

Where, as indicated in the subsequent tables appearing herein, reversible electrodes were used, the theoretical potentials (calculated by setting the transport numbers of the calcium and barium ions as equal to unity) of double concentration cells with alkaline earth salts could be calculated exactly. The appropriate mean molal activity data employed was that listed by H. S. Harned and B. B. Owen, "Physical Chemistry of Electrolytic Solutions," Reinhold Publishing Co., New York, N.Y., 1958 and that of R. A. Robinson and R. H. Stokes, "Electrolytic Solutions," Buttersworth Scientific Publications, London, 1955, were employed.

When saturated calomel reference electrodes were used, the single ion activity coefficients given by B. E. Conway "Electrochemical Data," Elsevier Publishing Co., New York, N.Y., 1952, and cited in Example 1 above, were employed. For more concentrated solutions, the single cationic activity was calculated from the mean activity. This method is described by H. P. Gregor and K. Sollner, Journal of Physical Chemistry, vol. 50, page 53 (1946).

The potential of the solution chain employed in this study as reflected in the following tables and as measured between silver-silver chloride electrodes at 25° C., is, $$E_{mv.} = 29.58 \log_{10} \frac{4m_A{}^3 T_A{}^3}{m_B(2m_B + m_C)^2 T_B{}^3}$$

where $T_A$ and $T_B$ are the mean molal activity coefficients of the 2–1 electrolyte in solution (1) and in the solution of mixed electrolytes (2), respectively. When saturated calomel electrodes were employed, $$E_{mv.} = 28.58 \log_{10} \frac{m_A T_A{}^{++}}{m_B T_B{}^{++}}$$

where $T_A{}^{++}$ and $T_B{}^{++}$ are the molal activity coefficients of the divalent cationic species in solutions A and B. All results given in the tables are obtained with protected electrodes, unless otherwise specified.

Tables I–VI give the results of measurements on a number of solution chains, employing several different membrane electrodes of the various types. Data on the double concentration cell measurements which preceded and followed each of the tabulated values are not included. As with the unprotected electrodes, about 80% of all protected electrodes constructed were found to function properly. The table headings are self-explanatory; activity coefficients were calculated using Harned's Rule and designated $T_B{}^*$. The activity coefficient of the alkaline earth cation in the pure reference solution in Table III is taken from B. E. Conway, "Electrolytic Solutions," cited above. This latter table shows a number of measurements made using mixtures of calcium chloride and potassium chloride at different concentrations.

TABLE I.—POTENTIALS OF SOLUTION CHAINS OF MIXED CALCIUM AND POTASSIUM CHLORIDES MEASURED WITH CALCIUM STEARATE MULTILAYER MEMBRANE ELECTRODE B AT CONSTANT TOTAL IONIC STRENGTH ($\mu_T$)
Chain:
 Ag | AgCl | Solution (1) | Membrane | Solution (2) | AgCl | Ag

| Solution (2) | | E.M.F., mv. | $T_B$ | $T_B{}^*$ |
| --- | --- | --- | --- | --- |
| CaCl$_2$ (B), m | KCl (C), m | | | |
| Solution (1)—0.00100m CaCl$_2$; For solution (2), $\mu_T$=0.0003 | | | | |
| 0.0001000 | 0.0000000 | 85.4 | 0.940 | ----- |
| .0000833 | .0000500 | 86.8 | .945 | ----- |
| .0000667 | .000100 | 88.4 | .930 | ----- |
| .0000500 | .000150 | 90.2 | .931 | ----- |
| .0000333 | .000200 | 93.5 | .938 | ----- |
| Solution (1)—0.00100m CaCl$_2$; For solution (2), $\mu_T$=0.003 | | | | |
| 0.00100 | 0.00000 | 0.00 | 0.889 | ----- |
| .000833 | .000500 | 0.24 | .890 | ----- |
| .000667 | .00100 | 0.83 | .887 | ----- |
| .000500 | .00150 | 3.05 | .892 | ----- |
| .000333 | .00200 | 6.80 | .888 | ----- |
| .000167 | .00250 | 13.85 | .894 | ----- |
| Solution (1)—0.0100m CaCl$_2$; For solution (2), $\mu_T$=0.03 | | | | |
| 0.0100 | 0.0000 | 0.00 | 0.731 | ----- |
| .00800 | .00600 | .47 | .731 | ----- |
| .00600 | .0120 | 1.72 | .735 | ----- |
| .00400 | .0180 | 5.05 | .732 | ----- |
| .00200 | .0240 | 11.75 | .736 | ----- |
| Solution (1)—0.200m CaCl$_2$; For solution (2), $\mu_T$=0.6 | | | | |
| 0.200 | 0.000 | 0.00 | 0.472 | 0.472 |
| .150 | .150 | .18 | .478 | .478 |
| .100 | .300 | 2.01 | .487 | .487 |
| .0667 | .400 | 5.15 | .491 | .492 |
| .0500 | .450 | 6.55 | .511 | .494 |
| Solution (1)—0.500m CaCl$_2$; For solution (2), $\mu_T$=1.5 | | | | |
| 0.500 | 0.000 | 0.00 | 0.448 | 0.448 |
| .400 | .300 | −1.22 | .466 | .462 |
| .300 | .600 | −.68 | .479 | .476 |
| .200 | .900 | +1.30 | .493 | .489 |
| .100 | 1.200 | +7.70 | .502 | .503 |

$T_B$ calculated from measured E.M.F.
$T_B{}^*$ calculated from Harned's Rule.

TABLE II.—POTENTIALS OF SOLUTION CHAINS OF MIXED CALCIUM AND POTASSIUM CHLORIDES MEASURED WITH CALCIUM STEARATE MULTILAYER MEMBRANE ELECTRODE B
Chain:
 Ag | AgCl | Solution (1) | Membrane | Solution (2) | AgCl | Ag

| Solution (2) | | $\mu_T$ | E.M.F., mv. | $T_B$ | $T_B{}^*$ |
| --- | --- | --- | --- | --- | --- |
| CaCl$_2$ (B), m | KCl (C), m | | | | |
| Solution (1)—0.0100m CaCl$_2$; For solution (2), m$_T{}^-$=0.02 | | | | | |
| 0.0100 | 0.0000 | 0.030 | 0.00 | 0.731 | ----- |
| .00800 | .00400 | .028 | 2.54 | .737 | ----- |
| .00600 | .00800 | .026 | 5.62 | .750 | ----- |
| .00400 | .0120 | .024 | 10.75 | .752 | ----- |
| .00200 | .0160 | 0.022 | 19.30 | .765 | ----- |
| Solution (1)—0.100m CaCl$_2$; For solution (2), m$_T{}^-$=0.2 | | | | | |
| 0.100 | 0.000 | 0.30 | 0.00 | 0.518 | 0.518 |
| .0800 | .0400 | .28 | 1.63 | .535 | .528 |
| .0600 | .0800 | .26 | 4.32 | .550 | .539 |
| .0400 | .120 | .24 | 9.48 | .550 | .547 |
| .0200 | .160 | .22 | 17.00 | .570 | .556 |
| Solution (1)—0.0100m CaCl$_2$; For solution (2), m$_T{}^-$=0.03 | | | | | |
| 0.0100 | 0.0000 | 0.030 | 0.00 | 0.731 | ----- |
| .00900 | .00150 | .0285 | 1.60 | .740 | ----- |
| .00800 | .00300 | .0270 | 3.91 | .741 | ----- |
| .00700 | .00450 | .0255 | 5.70 | .749 | ----- |
| .00600 | .00600 | .0240 | 8.29 | .752 | ----- |
| .00400 | .00900 | .0210 | 14.45 | .760 | ----- |
| .00200 | .01200 | .0180 | 23.90 | .781 | ----- |
| Solution (1)—0.200m CaCl$_2$ | | | | | |
| 0.100 | 0.0100 | 0.31 | 20.8 | 0.534 | 0.522 |
| .100 | .0500 | .35 | 17.3 | .520 | .518 |
| .100 | .100 | .40 | 13.2 | .512 | .513 |
| .100 | .200 | .50 | 6.56 | .502 | .503 |
| .100 | .500 | .80 | −6.31 | .482 | .482 |
| [1].00250 | .150 | .158 | −51.0 | .600 | .588 |
| [2].00100 | .100 | .103 | −61.8 | .616 | .633 |

[1] Soln. (1) is 0.0050m CaCl$_2$.
[2] Soln. (1) is 0.00200m CaCl$_2$.
m—molality.
m$_T{}^-$ is the total chloride molality.
m$_T$ is the total molality, equal to $3m_B + 2m_C$.

TABLE III.—POTENTIALS OF SOLUTION CHAINS OF MIXED CALCIUM AND POTASSIUM CHLORIDES MEASURED WITH CALCIUM STEARATE MULTILAYER MEMBRANE ELECTRODE B

Chain:

Saturated Calomel Electrode ‖ Solution (1) | Membrane | Solution (2) ‖ Saturated Calomel Electrode

| Solution (2) | | $\mu_T$ | E.M.F., mv. | $T_{Ca^{++}}$ | $T_{Ca^{++}}$* |
|---|---|---|---|---|---|
| $CaCl_2$ (B), m | KCl (C), m | | | | |
| Solution (1)—0.00100m $CaCl_2$ | | | | | |
| 0.00100 | 0.00000 | 0.003 | 0.00 | 0.797 | 0.797 |
| .000833 | .000500 | ------ | 2.95 | .812 | ------ |
| .000667 | .00100 | ------ | 6.05 | .796 | ------ |
| .000500 | .00150 | ------ | 10.1 | .776 | ------ |
| .000333 | .00200 | ------ | 15.5 | .766 | ------ |
| .000167 | .00250 | ------ | 18.4 | .770 | ------ |
| Solution (1)—0.00100m $CaCl_2$; For solution (2), $m_T$=0.002 | | | | | |
| 0.00100 | 0.00000 | 0.0030 | 0.00 | 0.797 | 0.797 |
| .000800 | .000400 | .0028 | 2.81 | .800 | .802 |
| .000600 | .000800 | .0026 | 6.36 | .810 | .807 |
| .000400 | .00120 | .0024 | 11.90 | .790 | .813 |
| .000200 | .00160 | .0022 | 20.70 | .795 | .821 |
| Solution (1)—0.0100m $CaCl_2$ | | | | | |
| 0.0100 | 0.0000 | 0.03 | 0.00 | 0.553 | 0.553 |
| .00800 | .00600 | ------ | 2.48 | .570 | ------ |
| .00600 | .01200 | ------ | 6.36 | .562 | ------ |
| .00400 | .01800 | ------ | 11.83 | .550 | ------ |
| .00200 | .0240 | ------ | 20.40 | .564 | ------ |
| Solution (1)—0.00500m $CaCl_2$ | | | | | |
| 0.00250 | 0.150 | 0.158 | 15.20 | 0.392 | 0.356 |

$T_{Ca^{++}}$ is the single ion activity for calcium calculated from the E.M.F. measurement.
$T_{Ca^{++}}$* is the value given by B. E. Conway, "Electrochemical Data," Elsevier Publishing Co., New York, N.Y., 1952.
m—molality.

TABLE V.—POTENTIALS OF SOLUTION CHAINS OF MIXTURES OF BARIUM CHLORIDE AND SODIUM CHLORIDE OR POTASSIUM CHLORIDE MEASURED WITH BARIUM HEXADECYLSULFATE MULTILAYER MEMBRANE ELECTRODE F

Chain:

Ag | AgCl | Solution (1) $BaCl_2 m_A$=0.200 | Membrane | Solution (2) | AgCl | Ag

| Solution (2) | | $\mu_T$ | E.M.F., mv. | $T_B$ | $T_B$* |
|---|---|---|---|---|---|
| $BaCl_2$(B), m | (C), m | | | | |
| 0.100 | 0.0100 NaCl | 0.31 | 20.2 | 0.504 | 0.493 |
| .100 | .0500 NaCl | .35 | 15.6 | .504 | .487 |
| .100 | .100 NaCl | .40 | 13.0 | .478 | .479 |
| .100 | .200 NaCl | .50 | 7.0 | .461 | .470 |
| .100 | .500 NaCl | .80 | −7.2 | .453 | .455 |
| .100 | .0100 KCl | .31 | 20.3 | .501 | .493 |
| .100 | .0500 KCl | .35 | 16.0 | .499 | .487 |
| .100 | .100 KCl | .40 | 13.0 | .478 | .479 |

TABLE VI.—POTENTIALS OF SOLUTION CHAINS OF MIXED BARIUM AND SODIUM CHLORIDES MEASURED WITH BARIUM STEARATE MULTILAYER MEMBRANE ELECTRODE A

Chain:

Saturated Calomel Electrode ‖ Solution (1) | Membrane | Solution (2) ‖ Saturated Calomel Electrode

| Solution (1), $BaCl_2$ (A), m | Solution (2) | | E.M.F. mv. | $T_{Ba^{++}}$ | $T_{Ba^{++}}$* |
|---|---|---|---|---|---|
| | $BaCl_2$ (B), m | (C), m | | | |
| 0.0200 | 0.0100 | 0.0200 NaCl | 8.10 | 0.477 | 0.465 |
| .0200 | .0100 | .00500 NaCl | 6.85 | .526 | .519 |
| 1.00 | .500 | 2.00 NaCl | 3.27 | --- | --- |
| .00500 | .00250 | .150 NaCl | 17.90 | .315 | .305 |
| .00500 | .00250 | .150 KCl | 16.75 | .345 | .305 |
| .00200 | .00100 | .100 KCl | 18.40 | .350 | .380 |

$T_{Ba^{++}}$ is the single ion activity for barium calculated from the E.M.F. measurement.
$T_{Ba^{++}}$* is the value given by Conway, "Electrochemical Data," cited above.

TABLE IV.—POTENTIAL OF SOLUTION CHAINS OF MIXTURES OF BARIUM CHLORIDE AND SODIUM CHLORIDE OR POTASSIUM CHLORIDE MEASURED WITH BARIUM STEARATE MULTILAYER MEMBRANE ELECTRODE A

Chain:

Ag | AgCl | Solution (1) | Membrane | Solution (2) | AgCl | Ag

| Solution (1), $BaCl_2$(A), m | Solution (2) | | $\mu_T$ | E.M.F. | $T_B$ | $T_B$* |
|---|---|---|---|---|---|---|
| | $BaCl_2$(B), m | (C), m | | | | |
| 0.0200 | 0.0100 | 0.00250 NaCl | 0.0325 | 21.7 | 0.715 | ---- |
| .0200 | .0100 | .00500 NaCl | .035 | 19.4 | .709 | ---- |
| .0200 | .0100 | .0100 NaCl | .040 | 14.7 | .708 | ---- |
| .0200 | .0100 | .0100 KCl | .040 | 14.7 | .709 | ---- |
| .0200 | .0100 | .0500 KCl | .080 | −4.30 | .660 | ---- |
| .500 | .250 | .250 KCl | 1.00 | 12.90 | .427 | .426 |
| .00500 | .00250 | .150 KCl | .158 | −49.0 | .556 | .553 |
| .00200 | .00100 | .100 KCl | .103 | −62.6 | .613 | .622 |
| .200 | .200 | .000 KCl | .60 | .00 | .439 | .439 |
| .200 | .150 | .150 KCl | ------ | −.50 | .450 | .450 |
| .200 | .100 | .300 KCl | ------ | 1.33 | .461 | .461 |
| .200 | .0667 | .400 KCl | ------ | 4.26 | .468 | .468 |
| .200 | .0500 | .450 KCl | ------ | 6.80 | .472 | .473 |
| .500 | .500 | .000 KCl | 1.50 | 0.00 | .395 | .395 |
| .500 | .400 | .300 KCl | ------ | −1.75 | .418 | .417 |
| .500 | .300 | .600 KCl | ------ | −2.40 | .441 | .441 |
| .500 | .200 | .900 KCl | ------ | −1.33 | .466 | .465 |
| .500 | .100 | 1.200 KCl | ------ | 3.58 | .492 | .491 |

TABLE VII.—CHLORIDE ION ACTIVITIES IN MIXED CALCIUM AND POTASSIUM CHLORIDE SOLUTIONS

Chain:
Ag | AgCl | Solution (1) || Saturated Calomel Electrode

| Solution (1) | | E.M.F. mv. | $T_-$ |
|---|---|---|---|
| $CaCl_2$ (B) | KCl (C) | | |
| $\mu_T = 0.003$; $T_- = 0.980$ (from Conway, "Electrochemical Data") | | | |
| 0.0000833 | 0.0000500 | −199.2 | 0.975 |
| .0000667 | .000100 | −197.5 | .993 |
| .0000500 | .000150 | −195.2 | .988 |
| .0000333 | .000200 | −195.0 | .943 |
| $\mu_T = 0.003$; $T_- = 0.941$ [5] | | | |
| 0.000833 | 0.000500 | −141.5 | 0.922 |
| .000667 | .00100 | −139.7 | .932 |
| .000500 | .00150 | −136.9 | .972 |
| .000333 | .00200 | −135.6 | .963 |
| .000167 | .00250 | −134.6 | .940 |
| $\mu_T = 0.03$; $T_- = 0.841$ [5] | | | |
| 0.00800 | 0.00600 | −84.1 | 0.853 |
| .00600 | .0120 | −82.3 | .840 |
| .00400 | .0180 | −80.0 | .845 |
| .00200 | .0240 | −78.3 | .842 |

An arrangement identical to that described hereinabove and employed in Example 1 is shown in FIGURES 1 and 2. The protected electrode system used in Example 2 is illustrated in FIGURE 3. With reference to these drawings thereto, FIG. 1 represents a cross-sectional plan view of a concentration cell showing the multilayer membrane electrode of the invention in an exaggerated section, together with one arrangement for effecting separation of the respective solutions. FIG. 2 represents a cross-sectional view taken along line 2—2 of FIG. 1 to further illustrate the unprotected membrane electrode assembly.

As shown in FIGURES 1 and 2, an outer container 11 and inner container 12 are provided to contain the solution phases designated I and II (FIG. 2). The multilayer membrane electrode assembly which is designated in general by reference numeral 13, comprises glass half-slides 14 coated with a monomolecular initial layer of ferric stearate 15 and a multilayer of barium stearate 16. The membranaceous filament consisting of layers 15 and 16 is positioned between two glass slides 17 each having a hole, typical dimensions of which are lengthwise one cm. and width, about 2500 A., therein, to expose the multilayer membrane to the solution phases on each side thereof. Separation piece 18 is provided to complete the isolation of solution I (19) and solution II (20) from each other, other than through the multilayer membrane.

In the embodiment illustrated, solution I comprises a solution containing barium ions as indicated by the symbol O, whereas solution II contains sodium ions (Δ) and barium ions. The remaining portions of the unit are cross-referenced to the foregoing text by means of legends to facilitate an uderstanding of the cell structure and operations.

FIGURE 3 shows a cross-sectional view of one-half of the modified and protected multilayer electrode of the present invention; the other half section of the electrode being a duplicate of that illustrated. This assembly comprises glass half slides 14 coated with an initial monomolecular layer of one salt of a long-chain fatty acid 15, ferric stearate for example, and a multilayer 16 of a salt of a second long-chain fatty acid such as calcium or barium stearate. The polymeric cation permeable membrane 22 is positioned toward the inner end of the exposed surfacves of the glass half-slides and the outer surfaces of the multifilament layer indicated by the numerals 15 and 16. While desirably formed of an interpolymer formed from polystyrene-sulfonic acid and a copolymer of acrylonitrile and vinyl chloride, this cation-permeable membrane may be formed of other materials as well. It is noted that while this membrane is desirably soaked in a solution of an alkaline earth salt prior to use, a completely dry membrane can also be used, so long as it does not become too brittle for effective use, or become impermeable irreversibly upon drying out. It is further noted that the presence of a cation permeable membrane is optional where the concentrations of different salts present in solution are not such as will cause disruption of the multilayer membrane or crystal. Indeed, electrodes assembled without the cation-permeable membranes are somewhat superior to unprotected units in that their ion-specificity does not decay as rapidly. The cation-permeable membrane is in the range of 20 to 30 microns in thickness. Positioned next to the exposed surfaces of the cation permeable membranes or on either side of the glass slides 17 (as seen in FIGURE 2) if the cation permeable membrane is absent, are porous glass (e.g. Corning Porous Vycor No. 9730) or unglazed porcelain (e.g. Selas Microporous Filter Media) segments. These segments have a pore diameter in the range of 40 A. to 80 microns. The individual thicknesses of these segments is in the range of 100 microns to 250 microns, and preferably in the range of 150 microns to 200 microns in thickness. While the porous glass employed is substantially smooth, this is not true of the porcelain so that a porous plastic film 26 is most desirably interposed between the porcelain and the cation-permeable membrane or if this latter member is not present, the glass slides and multilayer membrane. A suitable film is that employed in Example 2, a flexible polyvinyl chloride sheet with 85 percent pore volume and with an average pore diameter of 10 microns. A similar layer of material 28 may be optionally posited between the end blocks 30 formed of a rigid plastic material such as polymethyl methacrylate, unreactive and insoluble in the electrolytes employed with the electrode of the present invention. These end blocks 30 are placed outside of the porous glass or ceramic plates and then pressed toward the center of the electrode. A strong vice or C clamp 32 can be employed for this purpose. These end blocks 30 have orifices 34 and 36 which serve for the introduction and removal of electrolytic solutions and electrodes, indicated by the legends. The cement 38 is applied to the periphery of the cell unit, joining the faces of the glass half-slides 14 with the exposed surfaces of the porous glass or ceramic plate 24 and the remaining elements of the assembly. Solution arms (not shown) are substituted for the vice 32 after drying of the cement 38. When the cell is filled with solution the porous plate members 24 are shattered in their set position by re-wetting of the membrane. It is noted that a suitable plotting procedure may be substituted for the vice 32 in the process herein described.

What is claimed is:
1. A multilayer membrane comprising:
   (a) a multilayer comprising a salt of a counter ion and a long chain ion of opposite sign arranged such that potential determining ions from aqueous solutions can be exchanged with the same counter ion species in the multilayer and where the counter ion species can traverse the multilayer and exchange, in turn, with potential determining ions in the opposing solutions;
   (b) rigid supports disposed in contact with said multilayer normal to the axis of said long chain ions; and
   (c) membranaceous rigid supports impermeable to the ionic species comprising the long chain ions and permeable to the ionic species comprising the counter ions, said supports being disposed in contact with said multilayer parallel to the axis of said long chain ions.

2. An ion-specific membrane electrode comprising:
(a) a substantially insoluble, non-ionizable multilayer, said multilayer comprising a salt of a counter ion and a long chain ion of opposite sign arranged such that potential determining ions from aqueous solutions can be exchanged with the same counter ion species in the multilayer and where the counter ion species can traverse the multilayer and exchange, in turn, with potential-determining ions in the opposing solutions;
(b) non-conducting rigid supports disposed in contact with said multilayer normal to the axis of said long chain ions; and
(c) membranaceous rigid supports impermeable to the ionic species comprising the long chain ions and permeable to the ionic species comprising the counter ions, said supports being disposed in contact with said multilayer parallel to the axis of siad long chain ions.

3. An electrode for use in measuring the concentration of a selected ionic species with a test solution that comprises:
(a) a substantially insoluble, non-ionizable multilayer, said multilayer comprising a salt of a counter ion and a long chain ion of opposite sign arranged such that potential-determining ions from aqueous solutions can be exchanged with the same counter ion species in the multilayer and where the counter ion species can traverse the multilayer and exchange, in turn, with potential-determining ions in the opposing solutions;
(b) non-conducting rigid supports disposed in contact with said multilayer normal to the axis of said long chain ions; and
(c) membranaceous rigid supports impermeable to the ionic species comprising the long chain ions and permeable to the ionic species comprising the counter ions, said supports being disposed in contact with said multilayer parallel to the axis of said long chain ions.

4. The electrode as claimed in claim 3, wherein the non-conducting rigid supports are glass and said multilayer is comprised of a metal salt of an aliphatic monocarboxylic acid.

5. The electrode as claimed in claim 4, wherein the metal salt is calcium stearate.

6. The electrode as claimed in claim 4, wherein the metal salt is barium stearate.

7. An insoluble, non-ionizable electrode for use in determining selective ionic concentrations within a test solution that comprises:
(a) a multilayer comprising a salt of a counter ion and a long chain ion of opposite sign arranged such that potential determining ions from aqueous solutions can be exchanged with the same counter ion species in the multilayer and where the counter ion species can traverse the multilayer and exchange, in turn, with potential-determining ions in the opposing solutions;
(b) non-conducting rigid supports disposed in contact with said multilayer normal to the axis of said long chain ions;
(c) membranaceous rigid supports impermeable to the ionic species comprising the long chain ions and permeable to the ionic species comprising the counter ions, said supports being disposed in contact with said multilayer parallel to the axis of said long chain ions; and
(d) a porous material selected from the group consisting og glass and ceramic positioned adjacent the ends of said multilayer under pressure directed inwardly toward said multilayer.

8. An electrode as claimed in claim 7, wherein said membranaceous rigid supports are a cation-permeable polymeric membrane positioned at opposite ends of said multilayer.

9. An electrode as claimed in claim 7, wherein the pressure exerted inwardly towards said multilayer is within the range of 100 atmospheres to 300 atmospheres.

10. An ion-selective membrane electrode protected against disruption for use in concentration cells for the purpose of determining the effective concentration of a selected ionic species contained within an electrolytic test solution introduced into the cell and wherein the molar ratio of univalent cations to divalent cations is in excess of 10:1, that comprises:
(a) a substantially insoluble, non-ionizable multilayer, said multilayer comprising a salt of a counter ion and a long chain ion of opposite sign arranged such that potential-determining ions from aqueous solutions can be exchanged with the same counter ion species in the multilayer and where the counter ion species can traverse the multilayer and exchange, in turn, with potential-determining ions in the opposing solutions;
(b) non-conducting rigid supports disposed in contact with said multilayer normal to the axis of said long chain ions;
(c) cation-permeable membranes disposed about the opposite ends of said passage and about the opposite ends of said multilayer in parallel with the axis of said long chain ions; and
(d) a rigid porous material selected from the group consisting of glass and ceramic disposed exterior to the exposed surfaces of said membranes under a pressure of 100 to 300 atmospheres directed inwardly toward said multilayer.

References Cited by the Examiner

UNITED STATES PATENTS 2,614,976  10/1952  Patnode et al. _____ 204—195.1

FOREIGN PATENTS 492,936  9/1938  Great Britain.

OTHER REFERENCES

Blodgett, J.A.C.S. vol. 57 (1935) page 1007.

JOHN H. MACK, *Primary Examiner.*

JOSEPH REBOLD, JOHN R. SPECK, CARL D. QUARFORTH, REUBEN EPSTEIN, LEON D. ROSDOL,
*Examiners.*

T. TUNG, *Assistant Examiner.*